(12) United States Patent
Mayr et al.

(10) Patent No.: US 6,619,615 B1
(45) Date of Patent: Sep. 16, 2003

(54) PROPOTIONAL CONTROL PRESSURE VALVE

(75) Inventors: Karlheinz Mayr, Wasserburg (DE); Markus Eisele, Friedrichshafen (DE); Thilo Schmidt, Meckenbeuren (DE); Walter Kill, Friedrichshafen (DE); Hubert Remmlinger, Friedrichshafen (DE); Jochen Fischer, Friedrichshafen (DE); Robert Ingenbleek, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/890,169

(22) PCT Filed: Jan. 31, 2000

(86) PCT No.: PCT/EP00/00731

§ 371 (c)(1), (2), (4) Date: Jul. 26, 2001

(87) PCT Pub. No.: WO00/46534

PCT Pub. Date: Aug. 10, 2000

(30) Foreign Application Priority Data

Feb. 6, 1999 (DE) ......................................... 199 04 901

(51) Int. Cl.$^7$ ............................................... F16K 31/02
(52) U.S. Cl. .......................... 251/129.08; 251/129.02; 251/129.19
(58) Field of Search ...................... 251/129.08, 129.16, 251/129.02, 129.19; 137/625.65

(56) References Cited

U.S. PATENT DOCUMENTS

| | | | | |
|---|---|---|---|---|
| 4,251,051 A | * | 2/1981 | Quenneville et al. | 251/129.16 |
| 4,662,605 A | * | 5/1987 | Garcia | 251/129.08 |
| 5,067,524 A | | 11/1991 | Pickenhahn | 137/627.5 |
| 5,197,507 A | * | 3/1993 | Miki et al. | 137/625.65 |
| 5,259,414 A | * | 11/1993 | Suzuki | 137/625.65 |
| 5,503,364 A | * | 4/1996 | Enomoto et al. | 251/129.15 |
| 5,513,673 A | * | 5/1996 | Slavin et al. | 137/625.65 |
| 5,513,832 A | * | 5/1996 | Becker et al. | 251/129.15 |
| 5,547,165 A | * | 8/1996 | Brehm et al. | 251/129.16 |
| 5,848,613 A | * | 12/1998 | Sakaguchi et al. | 137/625.65 |
| 5,879,060 A | * | 3/1999 | Megerle et al. | 251/129.02 |

FOREIGN PATENT DOCUMENTS

| | | | |
|---|---|---|---|
| DE | 35 06 053 A1 | 8/1986 | H01F/7/16 |
| DE | 37 20 347 A1 | 1/1988 | F15B/11/02 |
| DE | 38 44 412 A1 | 7/1990 | F15B/13/04 |
| DE | 43 26 507 C2 | 6/1996 | F15B/13/044 |
| DE | 197 19 557 A1 | 10/1998 | F15B/13/043 |
| EP | 0 466 985 | 1/1992 | H01F/7/13 |
| WO | 98/48332 | 10/1988 | G05D/16/20 |

OTHER PUBLICATIONS

Mannesmann Rexroth, "Fluidtechnik von A bis Z", p. 266.

* cited by examiner

*Primary Examiner*—Gene Mancene
*Assistant Examiner*—John Bastianelli
(74) *Attorney, Agent, or Firm*—Davis & Bujold, P.L.L.C.

(57) ABSTRACT

A proportional pressure control valve is described capable of serving as a pilot, servo or direct control valve and having a pressure reducing function and a pressure maintaining function. The valve is comprised essentially of a valve housing (2) with inlet and outlet ports (4, 5, 6), a control element (7), an armature rod (8) and a proportional magnet (3). The proportional magnet (3) is an assembly of a magnet core (10), a magnet armature (11) and a magnet coil (12), whereby the proportional magnet (3) when in its range of operation possesses a nearly constant magnetic strength. In accord with the invention, when in a holding position of the magnetic armature (11) the smallest possible gap (13) exists between the magnet armature (11) and the magnet core (10). This gap is so dimensioned that the magnetic force between the two said components (10, 11) in the holding position is greater than the magnetic force in the operational area of the proportional magnet (3) and that the magnetic armature (11) can be made fixed in position by this said magnetic force.

16 Claims, 8 Drawing Sheets

PROPOTIONAL CONTROL PRESSURE VALVE

The invention concerns a proportional pressure control valve possessing a pressure reduction means and performs a pressure maintaining function. The valve is mainly comprised of a valve housing with inlet and outlet ports, a control element for the opening and closing of the valve seat or throttling orifice, an armature rod with an armature axis for connecting the control element with a proportional magnet, which latter is an assembly of a magnet core, a magnet armature and a magnet coil. The magnet armature is movable forward and back between two end positions, whereby the first position represents the hold position of the magnet armature, which means, that the magnet armature, by means of the control element is holding shut at least one valve seat.

A multiplicity of valves, of the above known mode of construction are known in the state of the technology. Such conventional valves are employed, for instance, as servo valves for the control of clutches in automatic transmissions of motor vehicles. In such transmissions, the principal hydraulic pressure, for example in the case of passenger car transmissions, runs about 10 bar or more. This principal pressure is normally reduced to a operating pressure of about 5 bar by a pressure reducing valve, to which the proportional pressure regulating valve is subjected. In order, for example, after the engagement of a clutch, to hold said clutch engaged, normally a safety over-pressure, which, more or less, represents the system pressure, is applied on the clutch cylinder and by means of additional holding valves, the necessary pressure is maintained. Following this arrangement, three valves, namely a proportional pressure regulator valve, a pressure reducing valve, and a pressure maintaining valve are necessary for operation, particularly in a clutch in an automatic transmission.

Thus it is the purpose of the invention, to make available a valve, which fulfills the above named functions, but in doing so, possesses a simpler design, for instance by having lesser components, and on this account is more economical to manufacture.

In accordance with the invention, the purpose will be achieved, in that, in the case of a proportional pressure control valve of the above type of construction, the smallest axial distance between the end surfaces of the magnet armature and the core of the magnet, is so dimensioned, that the magnetic force between the magnet armature and the magnet core, in this holding position, is greater than the magnetic force in the operating range of the proportional magnet. Further, the magnet armature, because of the excessive magnetic force in this holding position, can be sustained in its position. Advantageously, the invention makes use of the facts that a proportional magnet in its operating range exhibits a nearly horizontal force-thrust-line, and the magnetic force at a distance less than a certain thrust displacement, that is, a small distance between magnet armature and magnet core abruptly increases in comparison to the magnetic force in the operational range. In regard to the state of the technology, refer to Mannesmann-Rex-Roth: "Fluid Technik von A bis Z", "Der Hydraulik Trainer", Vol. 5, 04.95, page 266. Employing this magnetic characteristic with great magnetic forces at very small air gaps, by means of appropriate magnet dispositions, a coil current, that is a "snap-current" can be evoked, at which the operational range of the magnet is overstepped and the magnet armature is held within the field of the high magnetic force. By the connection of the magnet armature to the control element through the armature rod, the retaining force on the respectively closed valve seat of the control element is increased, so that this valve seat, even at an existing system pressure greater than 10 bar stays reliably closed. On this account, the achievement can be attained, that with the invented proportional pressure control valve, both a pressure reducing valve as well as a pressure retaining valve advantageously can be dispensed with, since their functions are collectively fulfilled by the invented valve. Further, a controller of this kind possesses, advantageously, a high pressure/current (p/l) ratio in its range of fine regulation between 0 and about 5 bar. Further, the holding function in accord with the invention, advantageously makes possible the blocking of masses inclined toward vibration in the pressure controller. Thus, stability as to oscillation is assured and the equipment is subject to mechanical wear only in a small degree.

In a preferred development of the invention, the control element possesses two control edges, which are designed as a flat seat and a slide edge. With such an arrangement, there is provided in a simple manner a cost effective design, especially of a 3/2-way pressure regulator with magnetic holding function of the magnet armature. In this design, the flat seat carries out the fulfillment of the pressure holding function and the pressure controller advantageously can be installed as a servo control element.

In a further development of the invention, the proposal is made, that between the magnet armature and the armature rod, a spring element be placed. For example this could be a screw spiral shaped compression spring. The achievement thereby gained is, that the armature rod does not directly contact the magnet armature, and further, a static redundancy between the flat seat of the control element and the end detent of the armature rod on the armature is compensated for.

Advantageously, the compression spring, which is placed between the armature rod and the magnet armature, exhibits a "hard" spring characteristic curve, wherein an overrun of the proportional range of the magnet is reached, as well as a quick switch of the magnet armature out of the operational range into the holding position takes place and a reinforcement of the snap effect is realized. The spring force of the compression spring is, in this matter, chosen in such a manner, that it is greater or equal to the maximum hydraulic controlling force on the flat seat. This maximum, hydraulic control force corresponds to the product of the maximal, hydraulic control pressure multiplied by the nominal area of the flat seat.

Advantageously, as a result of this situation, the spring brings about a "snap closure protection" in the hydraulic system. The Spring Rate of the compression spring is advantageously made as small as possible, so that even by a small coil current the magnet armature can be brought into the area of higher magnetic forces and thereby the holding function of the magnet armature is realizable. The magnet armature in this position is "snapped to".

The compression spring is further so designed in regard to its spring characteristic line, as well as its spring geometry, including, for instance, the length of the spring, the diameter of the spring wire, etc., and the fastening of the spring between the armature and the armature rod is so chosen, that in the holding position of the magnet armature the smallest possible axial distance between the magnet core and the magnet armature can be made to lie in the range of 0 to 0.3 mm, preferably $\leq 0.1$ mm. In the case of this distance, the magnetic force is sufficiently great as compared to the magnetic force in the operational range, so that the magnet armature, even during applied hydraulic principal pressure, advantageously remains in its end position.

Alternative to the above described realization of the least possible distance between the magnet core and the magnet armature, a spacer disk, made of a non-magnetic substance, can be inserted between the magnet core and the magnet armature. Such a spacer disk prevents a magnetic "adhesion" of the magnet armature on the magnet core. Also, by means of different construction of the thickness of said disk, advantageously a simple adjustment of the magnetic force becomes possible. Instead of a space disk, a non-magnetic coating can be provided on the magnet core and/or on the magnet armature, which assures a reliable holding of the axial distance between the magnet core and the armature.

In a particularly advantageous design, the distance between the end wall surface of the magnet core and that of the magnet armature, runs some 0.01 to 0.3 mm, preferentially, however, 0.10 mm. At this distance, already a sufficient magnetic holding force has been attained.

This maximum magnetic holding force, over the entire operational area of the pressure control valve, must be greater than that of the hydraulic force resulting from the maximum, hydraulic operational pressure. In yet another embodiment of the invention, the proposal is that the magnet coil be connected with an electrical control apparatus, which, in a predetermined, timely period, emits a current impulse to the magnet spool for the maintenance of the holding position of the magnet armature. In this way, assurance is given, that the magnet armature retains its holding position relative to the magnetic core and does not, without notice, "fall out". And so, advantageously, the tight seat of the control element remains reliably closed.

It has proven itself to be of advantage, that the electrical current impulse generates a current strength, which is greater than the holding current of the magnet coil and for instance, amounts to about 950 mA. Further the said current impulse appears in time related intervening distances of, for example, 20 ms, since this duration has been determined to be the time period in which the magnet armature can drop out of its hold position.

For a considered release of the magnet armature from its holding position, the magnet coil is subjected to an electrical control signal, which is done, for instance, by a reduction and subsequent increase of the control current, (loop control) in said magnet coil. In this way, in a simple manner, a release of the armature can be accomplished in an elegant way.

Alternatively, an intended release of the magnet armature from its holding position can be carried out by a pressure signal, which, for example, is done by an increase of the hydraulic principal pressure above the holding pressure. This pressure increase, for instance, acts upon the flat seat of the control element. Thereby, in an advantageous manner, a release of the magnet armature from the magnet core is effected by means of a movement of the armature rod Advantageously, the invented proportional pressure control valve can be used as a servo or relay valve. In this service the valve is preferentially designed as a 3/2-way proportional pressure control valve with a magnetic holding function of the magnet armature. This allows that, upon the use of the invented valve, both a pressure reducing valve, and a pressure sustaining valve can be dispensed with.

Alternatively, the invented proportional pressure controlling valve, can also be employed as a direct control valve, whereby the hydraulic system pressure is modulated by the proportional pressure control valve, and subsequently, the system pressure acts directly on a volume reinforcement slider, which possesses no pressure change means and which acts for the direct control of clutch in a motor vehicle transmission.

The proportional pressure control valve can be used as a pilot valve, as well as a direct control valve, in a hydraulic arrangement with a damper having a two stage characteristic curve. A following flow volume reinforcement slider connects on to said damper, that is, a slide for the minimizing of the pressure input upon the changeover from the holding phase into the operational phase.

Further goals, features, advantages and application possibilities arise from the following description of the embodiment examples, which are shown in greater detail in the drawings. Further, all described and/or illustratively depicted features, of themselves, or in any optional, logical combination yield the object of the invention, independently from its summaries in the claims and their references. There is shown in:

The pressure control valve 1 (FIG. 1) is essentially comprised of a valve housing 2 and a proportional magnet 3. Valve ports for inlet and outlet 4, 5, 6 are located in the under part of the valve housing 2. A control element 7 for the opening and the closing of valve seat 16 and a slide edge 17 is connected to an armature rod 8, which possesses an armature axis 9. The armature rod 8 penetrates a bushing 24 and one end of said armature rod 8 protrudes into the inner space of a magnet armature 11. The magnet armature 11, together with a magnet core 10 and a magnet coil forms the said proportional magnet 3.

For the connection of the control element 7 with the proportional magnet 3, a disk 21 is fastened to the said end of the armature rod 8. This end of the armature rod 8 with the disk 21 extends into an essentially cylindrical recess in the magnet armature 11. Between the disk 21 and the base of the recess in the armature 11 is located a screw shaped compression spring 20. Thereby, a rigid connection between the armature rod 8 and the magnet armature 11 is avoided. In the presentation shown here, in accord with FIG. 1, the magnet armature finds itself in its second end position. That is, in the "upper" detent position, so that the gap 13, between the end surface 14 of the magnet armature 11 and the end surface 15 of the magnet core is at its maximum. In the first end position, which corresponds to the invented hold position of the magnet armature, the separating distance of the said gap 13 runs approximately 0 to 0.3 mm, preferentially, this is ≦0.1 mm.

Figure 1:
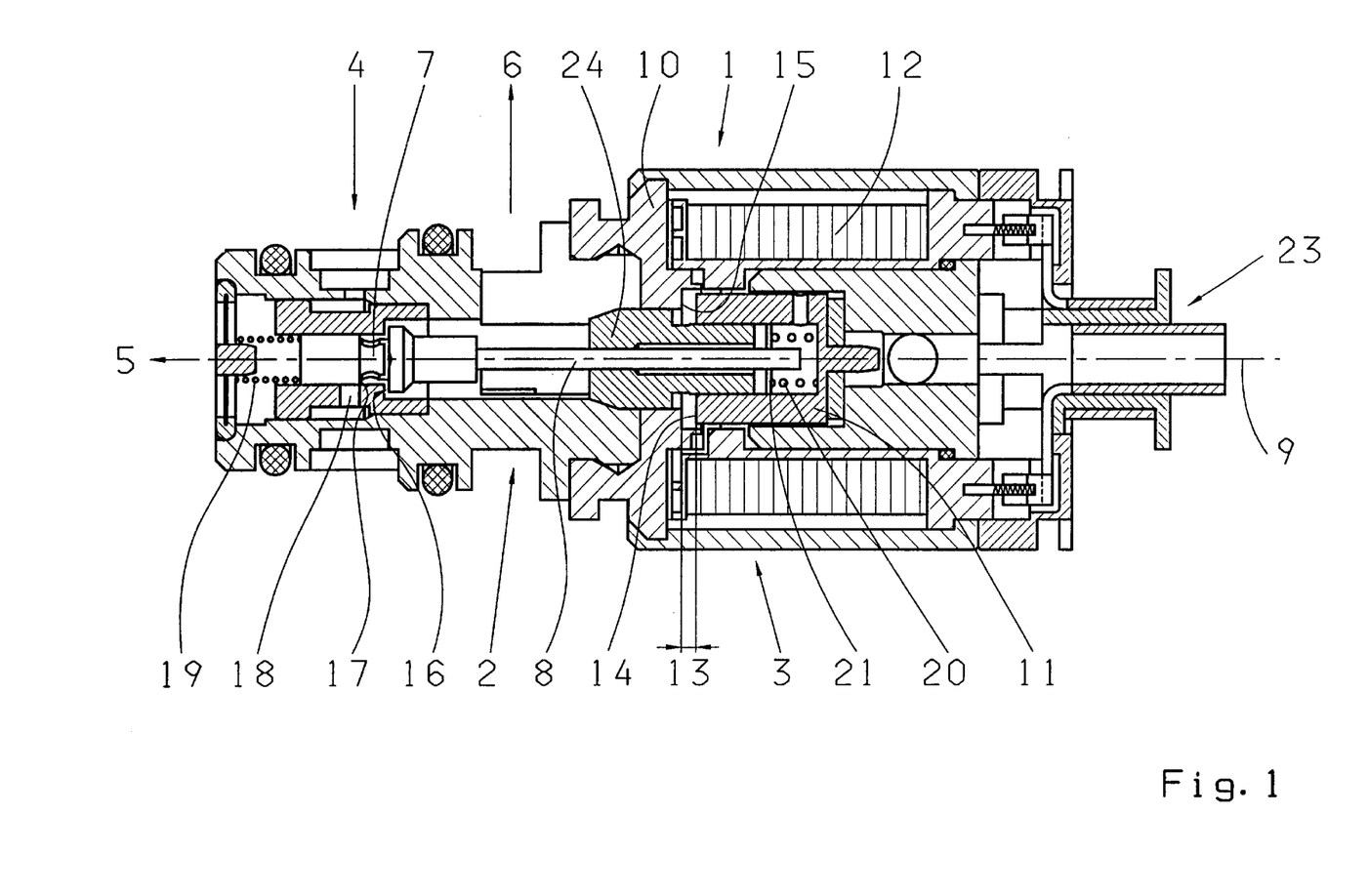
FIG. 1 a 3/2-way proportional, pressure control valve suitable for pilot valve service with a magnetic restraining function of the magnet armature in a closed end (CE) version, shown here in longitudinal profile.

The control element 7, in this arrangement, in the first place, is moved into its first "under" end position by the magnet armature 11 acting through the compression spring 20 and the disk 21. In this—not shown—hold position the flat seat is closed, so that the hydraulic pressure being exerted from the hydraulic inlet 4 through the three borings 18 cannot escape through the exit port 6. An opening of the flat seat 16 can be achieved, in that the electrical control current of the magnet coil is reduced, and thereby, correspondingly, also the magnetic holding force of the magnet armature declines to the extent, that the magnet armature releases itself from the magnet core 10. Subsequently, the control current is once again increased (a loop control) so that the pressure discontinuity upon the release of the armature is not noticeable in the fine control range 31 (see FIG. 3). Also, the flat seat 16 can be opened, if the hydraulic principal pressure within the entry port 4 and that of the annular chamber 18 is increased to the extent, that the hydraulic force on the "under" annular surface of the flat seat 16 is greater than the magnetic holding force, which holds the armature 11 fast to the magnetic core 10.

Upon the use of a coaxial plug-in means 23, the proportional pressure control valve 1 can be connection with a—not shown—electrical control apparatus.

Figure 2:
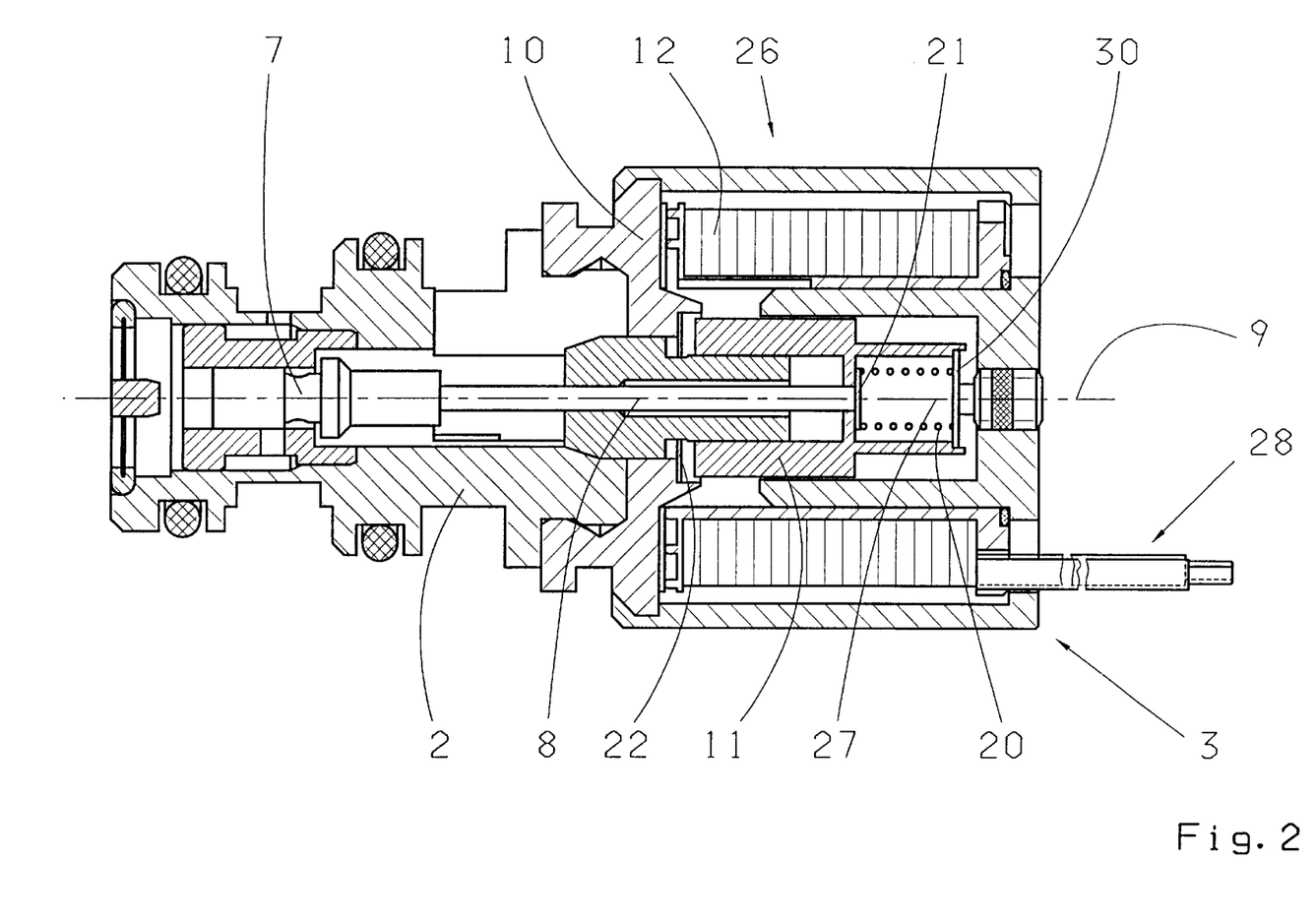
FIG. 2 a proportional, pressure control valve similar to the presentation of FIG. 1, however, with an alternative connection between the armature rod and the magnet armature.

In an alternative design in accord with FIG. 2, the valve depicted here corresponds, in its essential constructive features to the design in accord with FIG. 1, so that the same components in FIG. 1 and FIG. 2 can be designated by the same reference numbers. The difference between the two, however, lies in the connection of the armature rod 8 to the magnet armature 11. In this detail, the magnet armature 11 is provided on its upper side with a pot shaped part, the open upper side of which, is encapsulated by a closure disk 30, which is fastened onto the magnetic armature 11, for instance is force fit thereon. In the essentially cylindrical hollow space thereby formed, is found a disk 21, which serves as an abutment for a compression spring 20. Between this disk 21 and the closure disk 30 is provided the said compression spring 20.

The electrical inlet 28 binds the magnetic coil with a—not shown—electrical control apparatus.

By means of an increase of the coil current l (FIG. 3), there occurs in the fine control range 31, a linear increase of the control pressure p until the attainment of a pilot pressure of about 5 bar. At this value, for instance, a clutch which is controlled by this valve is closed. Upon reaching is pilot pressure and the electrical application of a coil current of 820 ma, a sudden vertical springing of the curve of the pressure occurs at a constant current, which increase is up to the principal pressure of 10 bar. After the reaching of the principal pressure, there follows a linear increase of the coil current l without further change in the pressure. This safety over-pressure, shown through the difference between 5 and 10 bar, makes certain, that the clutch remains reliably closed. This excess of pressure, in accord with the state of the technology, for a long period has been controlled by a pressure retaining valve. This valve can now be dispensed with, since the pressure retention function is carried out by the proportional pressure controller valve itself. Likewise, a separate pressure reducing valve can be omitted, the function of which was to limit the pressure to the achievement of the pilot pressure. The behavior of the invented valve is also designated as a "snap-function", since the magnet valve, upon reaching the value of the "snap-current" of 820 ms exhibits a sudden upward spring in pressure, as is to be seen in FIG. 3.

Figure 3:
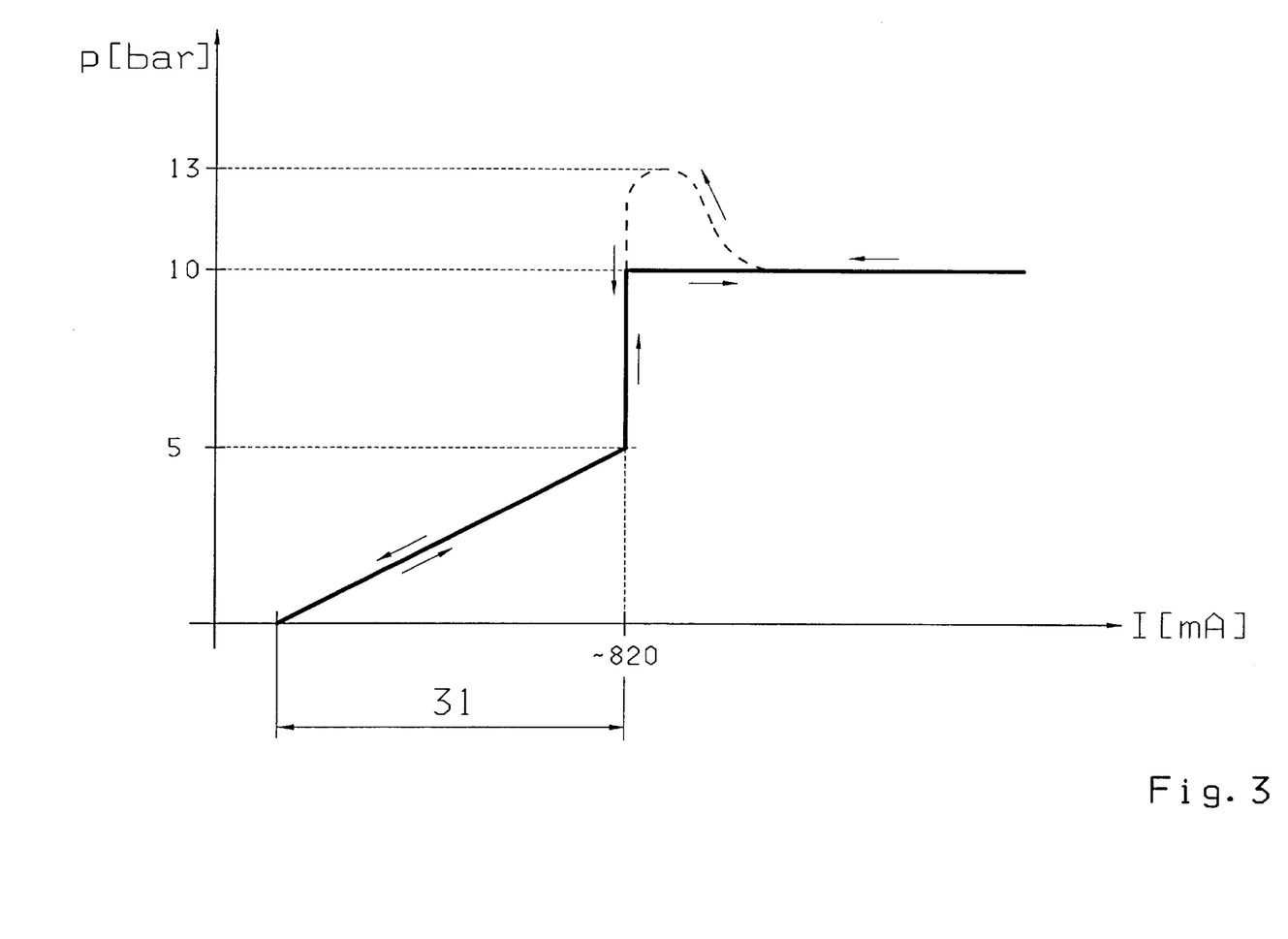
FIG. 3 a schematic presentation of a characteristic curve for the relationship of the pressure p against the coil current l, in the case of an invented valve with a holding function.

An opening of the magnetic valve, i.e. a "back-snap" can, in a like manner, be achieved, wherein an excess of pressure is applied, for example this being the system pressure of 13 bar, which acts upon the flat seat of the control element and thereby on the magnet armature by way of the armature rod is lifted away from the magnet core.

Used as a basis for the following measurement (FIG. 4) is a pressure controller with 12 V operational voltage and a pressure control range of 0 to 12 bar. The measurements were carried out during time period of twice 12 s. The air gap, that is, the minimal distance between the magnet armature and the magnet core, had the value of 0.1 mm. Upon a run of the measured values p and Q against l, the curve exhibited a great likeness to the presentation of FIG. 3 where the pressure curve was concerned. Upon an increasing coil current, above about 200 mA, a linear increase of the pressure up to about 6 bar took place. In connection thereto, occurred a pressure jump from 6 to 10 bar at a "snap current" of about 950 mA. In the case of the shown loop control, there next occurred an excessive increase of the coil current and a subsequent drop thereof. Upon reaching an l-value of about 900 mA, the valve pressure was reduced in two stages. Subsequently, there followed linear reduction of the pressure p along a line parallel to the pressure increase.

Figure 4:
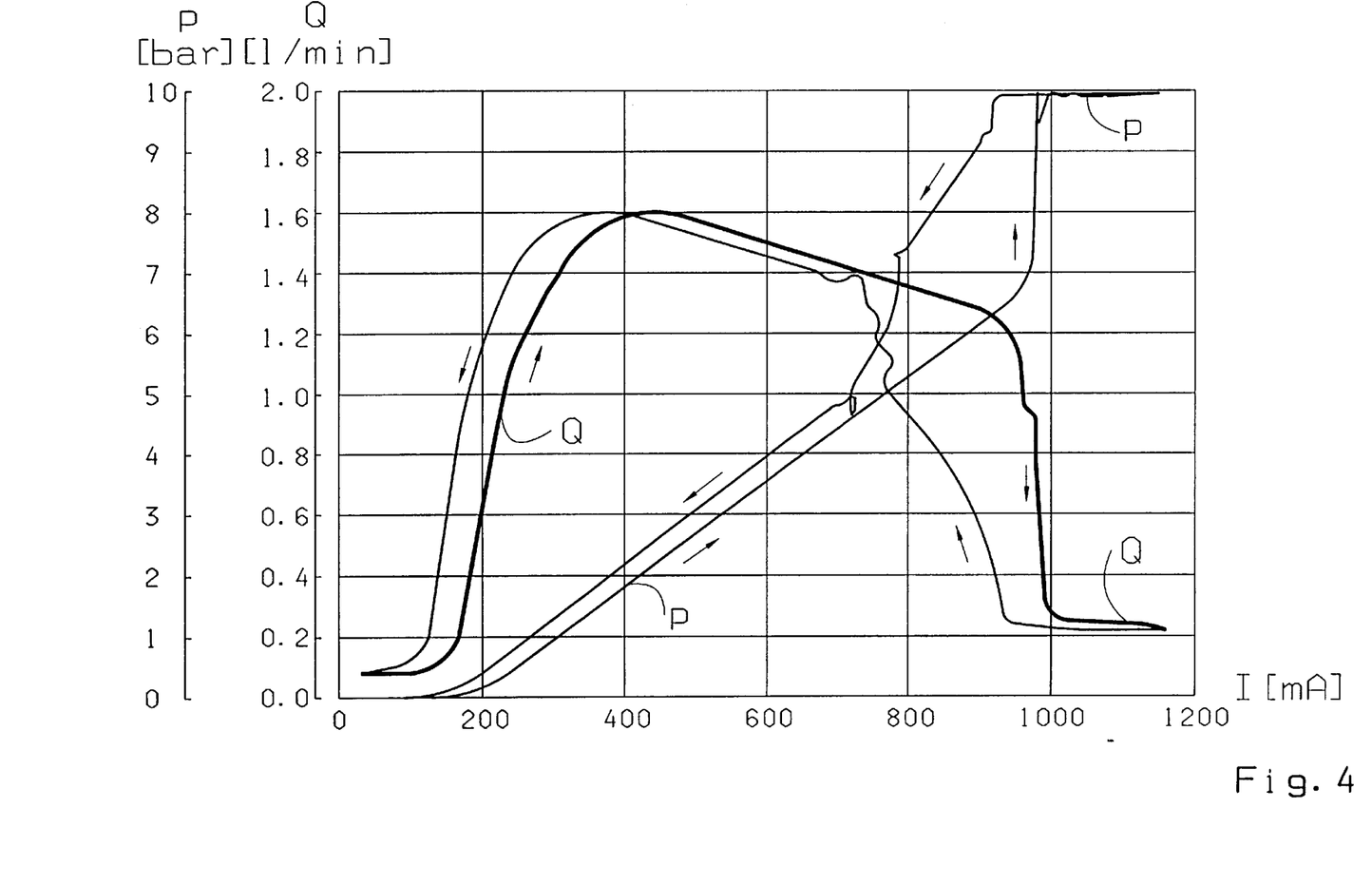
FIG. 4 a measurement diagram showing the characteristic curves for the course of the pressure p and the through-flow quantity Q against the current l.

The course of the through-put flow curve Q follows in like manner, a loop, wherein, however, the curve of the through-put Q is different from that of the pressure curve p. With increasing coil current l, there follows immediately a steep increase of the through-put quantity, up to maximum of 1.6 l/min. Upon further increase of the coil current, there followed a stepwise reduction of the through-put quantity down to a value of about 0.2 l/min, which is attributed to a residual leakage at the flat seat. This value, because of the high magnetic holding force, i.e. pressing force at of the flat seat, is much less with the flat seat in accord with the invention, than in the case of the flat seat employed by mass-produced valves. The curve of the through-put quantity Q upon recession of the coil current l follows an essentially parallel curve, but one which, however, is above the curve for the through-put quantity during the increase of the current l.

Figure 5:
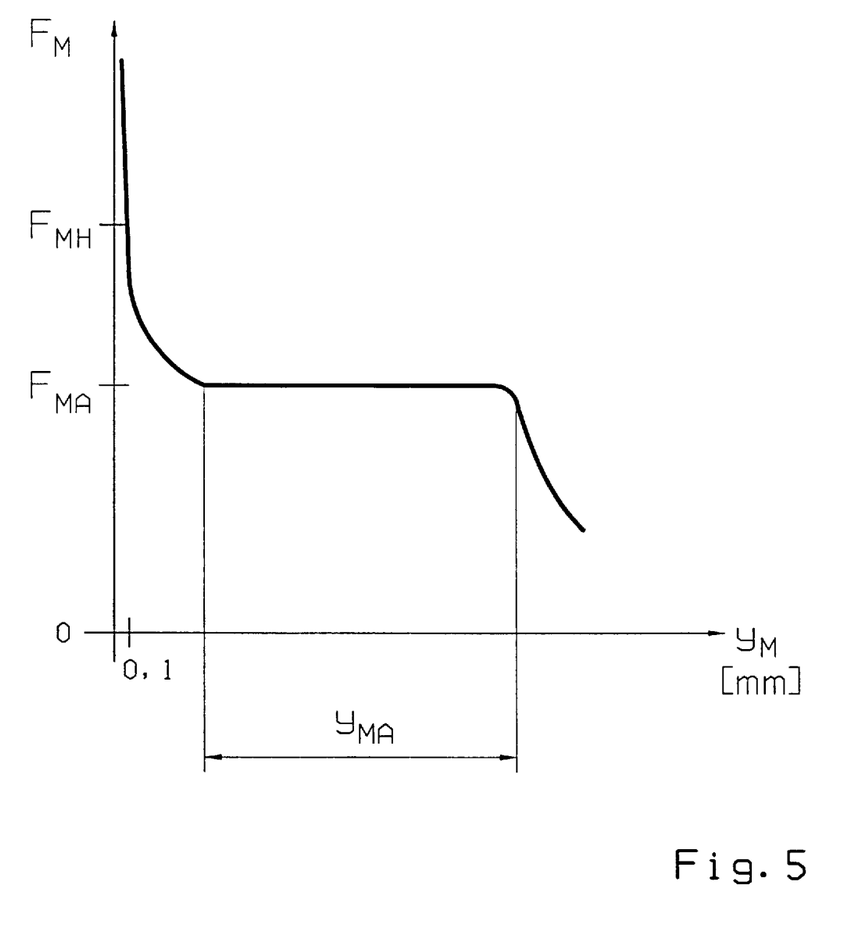
FIG. 5 in schematic presentation, a magnetic force thrust curve in the case of a proportional magnet.

As has already been mentioned before, the inference from the state of the technology (FIG. 5) is that, a proportional magnet, while in its operational range $Y_{MA}$ follows a nearly horizontal force-thrust-characteristic curve. In the operational range $Y_{MA}$, the magnetic force $F_{MA}$ is essentially constant. Upon a further increasing thrust $Y_M$ the magnetic force $F_M$ diminishes. Upon decreasing magnetic thrust, $Y_M$ then the magnetic force $F_M$ increases substantially. In the case of a thrust $Y_M$ of 0.1 mm, the magnetic force $F_{MH}$ in the holding zone possesses a significantly greater value than does the magnetic force $F_{MA}$ in the operational range. The invention makes use of this fact, in that the magnetic armature of the proportional magnet, by means of a current increase of the magnet coil is drawn toward the magnet core and thus a clear increase of the closing force on the flat seat is achieved.

Figure 6:
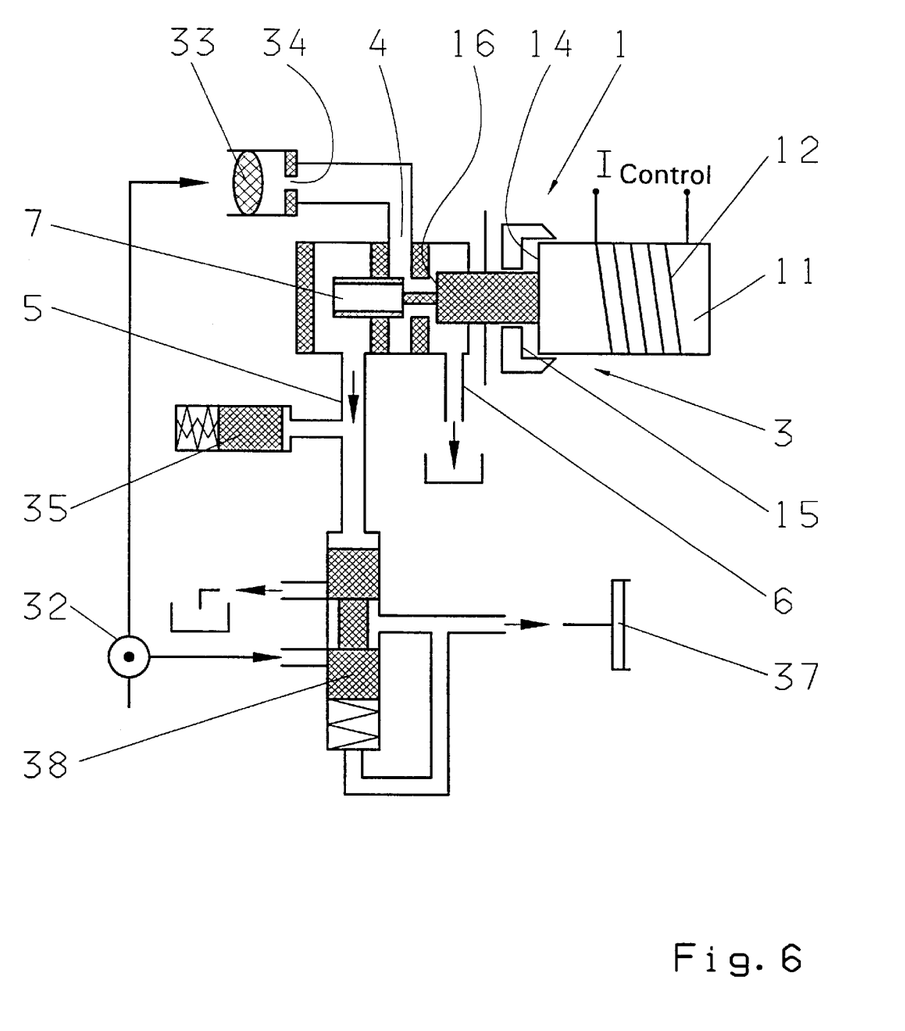
FIG. 6 in schematic presentation, an arrangement with a proportional, pressure control valve, a two stage damping device and a volume reinforcement slide.

In a hydraulic arrangement (FIG. 6), by means of a pump 32, a hydraulic system pressure in a hydraulic fluid is produced. This fluid is pumped through a filter 33 and an orifice 34 to an intake port 4 of the pressure control valve 1. The valve 1 corresponds in its function, essentially to the presentation in FIG. 1. By means of the operational connection 5 of the pressure control valve 1, this valve is connected to a flow volume reinforcement slider 38. Between the pressure control valve 1 and the flow volume reinforcement slider 38 is inserted a 2-stage damping device 35. The slider 38 is connected to a clutch 37.

Figure 7:
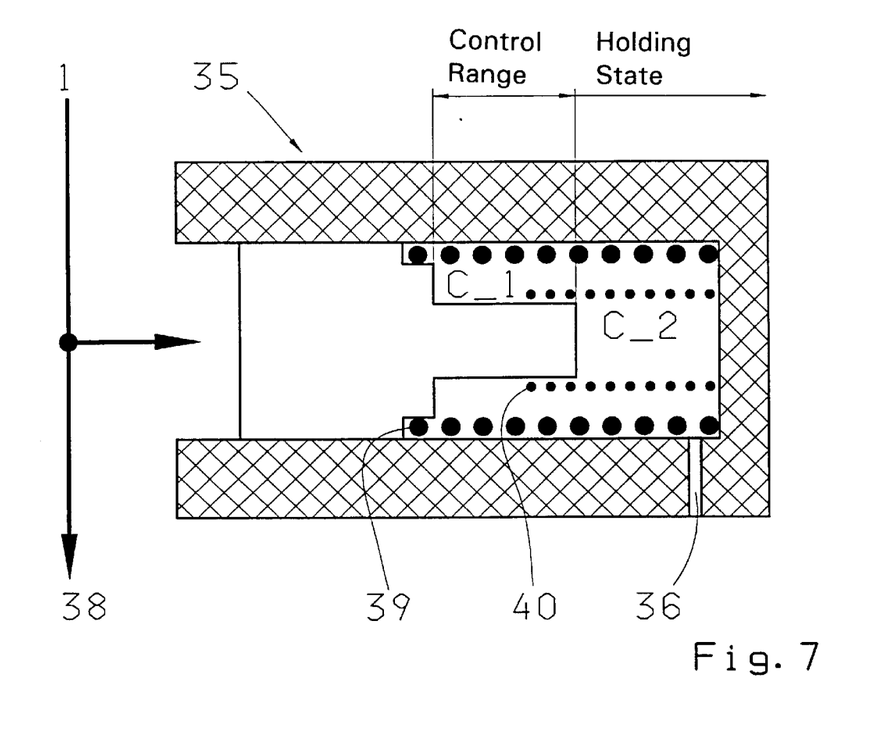
FIG. 7 a cross sectional presentation of a two stage damping device.

The 2-stage damping device is shown again in schematic form and enlarged scale in FIG. 7. The feed to the damping device 35 is from the pressure regulating valve 1. The branched flow continues to the volume flow reinforcement slider 38. The dampening device 35 consists essentially of a pot-shaped damper housing with a restrictive boring 36. In the interior of the damper is to be found a compression spring 39 with a spring constant C1, as well as a second compression spring 40 with a spring constant C2. This spring arrangement allows that in the operational range, first the spring 39 with the spring constant C1 is compressed. After the transition from the operational range into the holding state, then the damping is accomplished by means of the two springs 39 and 40.

Figure 8:
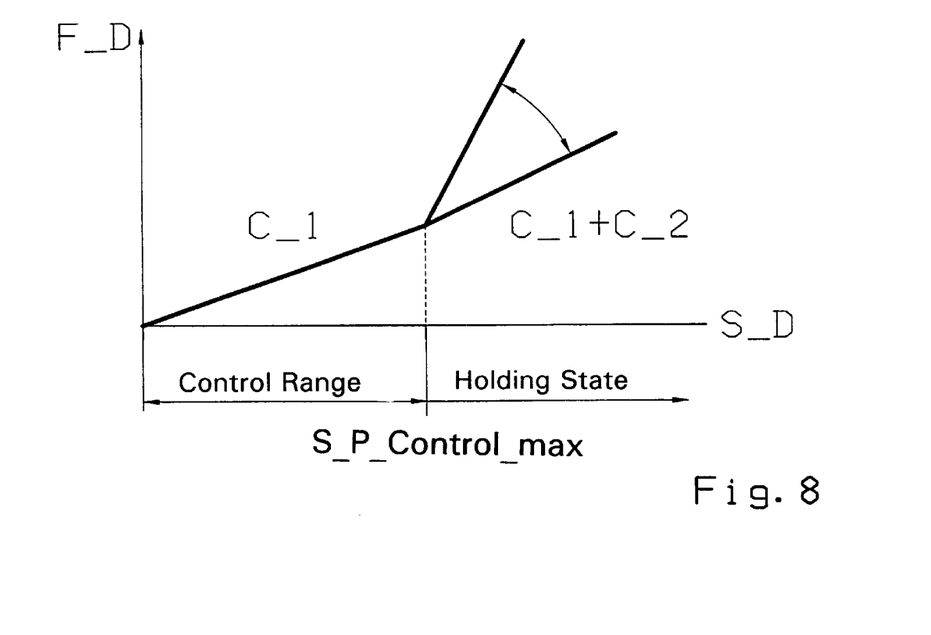
FIG. 8 a characteristic curve of the damping force through the damping path for a two stage damping device in accord with FIG. 7.

In a curve of the damping force $F_D$ plotted against damping $S_D$, (FIG. 8), the curve begins, during the control zone, with a linear increase in accord with the spring rate C1 up to the spring $S_{P\text{-}control\text{-}max}$, at which the maximum control pressure is reached. In the subsequent holding state, then both the spring rates C1 and C2 are additive, whereby the increase of the characteristic line can be adjusted at a rate set by an optional combination of the two spring rates.

Figure 9:
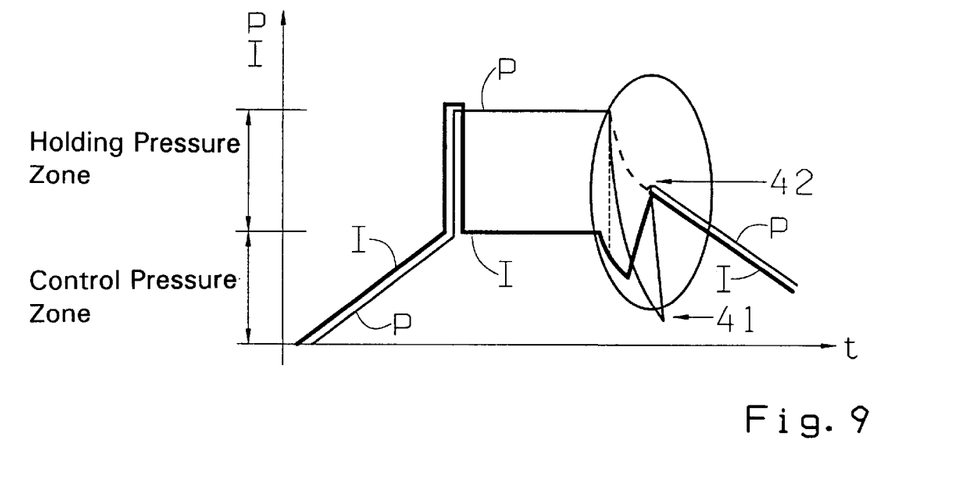
FIG. 9 in schematic presentation, a characteristic curve of the pressure p and the coil current l during a time t.

The action of a of the said 2-stage damper on the pressure break in an invented pressure control valve is presented in FIG. 9. By a linear increase of the coil current l, there is generated essentially immediately a linear increase of the pressure p in the zone of control pressure. Subsequently, there follows an abrupt climb of both the coil current l and the pressure p up to the system pressure. Up to the attainment of the enlarged presented curve of the pressure break, the pressure p is held somewhat constant at the holding pressure level, while the coil current l, that is, the current impulse, exhibits so-called refresh peaks, which, for the sake of simplicity are not shown, for the maintenance of the holding function.

In the enlarged pictured window of time, which, for instance represents a duration of some 50 msec, first the current l reverses, whereupon the pressure curve p sinks from its hold pressure to the pressure break point 41. Upon a rapid rise of the coil current l, the course of the pressure p is once again captured and, under control, reenters into the control pressure zone. This corresponds to a curve with a conventional damper.

Upon the use of the 2-stage damper, the break in pressure is significantly lessened, so that the pressure curve p is immediately captured at a pressure break point 42 above the control pressure level and subsequently can be monitored back into the control pressure zone.

| Reference Numbers |
| --- |
| 1 Pressure control valve |
| 2 Valve Housing |
| 3 Proportional magnet |
| 4 Inlet port |
| 5 Operational connection |
| 6 Outlet port |
| 7 Control element |
| 8 Armature rod |
| 9 Armature axis |
| 10 Magnet core |
| 11 Magnet armature |
| 12 Magnet coil |
| 13 Gap (between core and armature) |
| 14 surface of end of magnet armature |
| 15 surface of end of magnet core |
| 16 Flat valve seat |
| 17 Sliding edge (at valve port) |
| 18 Boring |
| 19 Spring (at lower end of rod) |
| 20 Compression spring (upper end) |
| 21 Disk (base for 20) |
| 22 Spacer (for gap 13) |
| 23 Coaxial plug in (electrical conn.) |
| 24 Bushing (for armature rod) |
| 26 Pressure control valve (FIG. 2) |
| 27 Movement space (top of rod) |
| 28 Electric connection opening |
| 30 Closure disk |
| 31 Fine control range (FIG. 3) |
| 32 Pump (FIG. 6) |
| 33 Filter |
| 34 Orifice |
| 35 Damping device, damper 2-stage |
| 36 Orifice boring in FIG. 7 - Air |
| 37 Clutch |
| 38 Flow volume reinforcement slide |
| 39 Spring |
| 40 Spring |
| 41 Pressure break (critical point) |
| 42 Pressure break (critical point) |
| $F_M$ — Magnetic Force |
| $F_{MH}$ — Magnetic force, holding area |
| $F_{MA}$ — Magnetic force, operational |
| $F_{FEDER}$ — Spring Force |
| $F_{MAX\text{-}REGEL}$ — Max Hyd. control press. |
| $F_D$ — Damper force |
| $Y_M$ — Magnet thrust |
| $Y_{MA}$ — Operational range |
| p — Pressure |
| $P_{Sys}$ — System pressure |
| I — Coil current |
| Q — Through flow quantity |
| $S_D$ — Damping |
| C — Spring Rat |

What is claimed is:

1. A proportional pressure control valve comprising:

a valve housing (2) with inlet and outlet ports (4, 5, 6), a control element (7) with control surfaces (8, 9) for the opening and closing of port openings;

an armature rod (8) aligned along an armature axis (9) and connected to the control element (7);

a proportional magnet (3) having a magnet coil (2), a magnet core (0), and a magnet armature (1) connected to the armature rod (8) by a spring (20) to provide relative movement with respect thereto and the magnet armature is movable back and forth along the armature axis (9);

a first position where the proportional magnet (3) exerts in an operational range ($Y_{MA}$) a nearly constant first proportional magnetic force ($F_{MA}$) on the magnet armature to provide for the relative movement of the magnet armature along the armature axis (9); and a second position where the magnet armature (1) is located at a smallest axial distance to the magnet core (0) and a second magnetic holding force ($F_{MH}$), is generated between the magnet armature (1) and the magnet core (0) which is greater than the first proportional magnetic force ($F_{MA}$) in the operational range ($Y_{MA}$) of the proportional magnet (3), and the magnet armature (1), by means of the second magnetic holding force ($F_{MH}$), is maintained in the second position.

2. The proportional pressure control valve as set forth in claim 1, wherein the control element (7) comprises a first and second control surfaces, which are constructed as a flat seat (16) and a sliding edge (17).

3. The proportional pressure control valve as set forth in claim 1, wherein the spring between the magnet armature (11) and the armature rod (8) is a compression spring (20), so that the armature rod (8) does not touch the magnet armature (11) in a fine regulation range (31).

4. The proportional pressure control valve as set forth in claim 3, wherein the compression spring (20) has a spring force ($F_{FEDER}$) which is greater or equal to a maximum hydraulic control force ($F_{MAX\ REGEL}$) exerted on the flat seat (16) of the first control surface.

5. The proportional pressure control valve as set forth in 4, wherein the compression spring (20) has a minimal Spring Rate (C) to permit, even in the case of a small coil current (I), the magnet armature (11) to be brought into the second position where an area of higher magnetic force ($F_{MH}$) holds the magnet armature (11) in the second position.

6. The proportional pressure control valve as set forth in claim 1, wherein in the second position an axial gap between the magnet core (10) and the magnet armature (11) is provided in a range of about 0 to 0.3 mm, and the connection between the armature rod (8) and the magnet armature (11) provided by the spring (20) and permits the holding force Fmh to be adjustable according to a length of the armature rod (8).

7. The proportional pressure control valve as set forth in claim 1, wherein provided between the magnet core (10) and the magnet armature (11) is one of a spacer disk (22) made of a non-magnetic material and a non-magnetic coating applied on at least one of the magnet core (10) and the magnet armature (11) for the maintaining of an axial distance (13) therebetween.

8. The proportional pressure control valve as set forth in claim 7, wherein the axial distance (13) between an end surface (15) of the magnet core (10) and an end surface (14) of the magnet armature (11) is about 0.3 mm or less.

9. The proportional pressure control valve as set forth in claim 1, wherein the magnet coil (12) is connected with an electrical control apparatus, which in specified time based intervals emits a current impulse to the magnet coil (12) for maintaining the second position of the magnet armature.

10. The proportional pressure control valve as set forth in claim 9, wherein the current impulse exhibits a current strength greater than a holding current of the magnet coil (12), and the current strength runs about 950 mA and the current impulse is emitted in the time based intervals of about 20 ms.

11. The proportional pressure control valve as set forth in claim 1, further comprising an electrical control signal provided to the magnet coil to release the magnet armature (11) from the second position, and the electrical control signal is a loop control providing a sudden reduction and increase of the control current to the magnet coil (12).

12. The proportional pressure control valve as set forth in claim 1, further comprising a pressure signal obtained as an increase of a principal hydraulic pressure to a value above that of the holding pressure to release the magnet armature (11) from the second position, and wherein the increase of a principal hydraulic pressure, acts upon a flat seat (16) of the control element (7).

13. The proportional pressure control valve according to claim 1 acting by application as a servo valve.

14. The proportional pressure control valve as set forth in claim 1 functioning as a direct control valve to modulate a system pressure ($p_{Sys}$) and acting directly on a flow volume reinforcement slider for the actuation of a clutch (37).

15. The proportional pressure control valve as set forth in claim 1, functioning as a pilot valve or a direct control valve in a hydraulic arrangement with a damping device (35) having a two-stage characteristic curve and a pressure converter slider acting as a flow volume reinforcement slider (38) for minimizing pressure breaks in any transition between a holding range and into an operating range.

16. A proportional pressure control valve comprising:

a valve housing (2) with inlet and outlet ports (4, 5, 6), a control element (7) with control surfaces (8, 9) for the opening and closing of port openings;

an armature rod (8) aligned along an armature axis (9) and connected to the control element (7);

a proportional magnet (3) having a magnet coil (2), a magnet core (0), and a magnet armature (1) connected to the armature rod (8) by a spring (20) to provide relative movement with respect thereto and the magnet armature is movable back and forth along the armature axis (9);

a first position where the proportional magnet (3) exerts in an operational range ($Y_{MA}$) a substantially linear first proportional magnetic force ($F_{MA}$) on the magnet armature to provide for the relative movement of the magnet armature along the armature axis (9); and a second position where the magnet armature (1) is located at a smallest axial distance to the magnet core (0) and a second substantially non-linear magnetic holding force ($F_{MH}$), is generated between the magnet armature (1) and the magnet core (0) which is greater than the first proportional magnetic force ($F_{MA}$) in the operational range ($Y_{MA}$) of the proportional magnet (3), and the magnet armature (1), by means of the second magnetic holding force ($F_{MH}$), is maintained in the second position.

* * * * *